March 6, 1962

N. L. LIVER 3,023,585

MIXED IN PLACE PILE

Filed Nov. 26, 1956

INVENTOR.
NORMAN L. LIVER
BY
*Alfred C Bode*
ATTORNEY

March 6, 1962 N. L. LIVER 3,023,585
MIXED IN PLACE PILE
Filed Nov. 26, 1956 2 Sheets-Sheet 2

INVENTOR.
NORMAN L. LIVER
BY
Alfred C. Body
ATTORNEY

United States Patent Office 3,023,585
Patented Mar. 6, 1962

---

3,023,585
MIXED IN PLACE PILE
Norman L. Liver, Gallion, Ala., assignor to Intrusion-Prepakt, Inc., Cleveland, Ohio, a corporation of Delaware
Filed Nov. 26, 1956, Ser. No. 624,282
8 Claims. (Cl. 61—36)

The present invention relates to the solidification, densification, and strengthening of the soil and earth formations and to the tools and apparatus therefor.

A method of solidifying earth and the tools used in such solidification is described in co-pending application Serial No. 310,394 filed September 19, 1952 by Louis W. Wertz, et al., now Patent No. 2,782,605, issued February 26, 1957. In this application the earth is solidified by mixing the soil in situ with a liquid solidifying agent by rotating a shaft having an elongated sidewardly extending blade about an axis while simultaneously advancing it axially of the earth so that the blade progressively moves and loosens the soil, and forcing a liquid solidifying agent into the earth adjacent the blade, the rotation of the blade mixing the soil with the solidifying agent. The patent application also describes the tool which is used, the tool having an elongated sidewardly projecting blade on the shaft adapted to create a cavity in the earth. A closed passage extending the length of the shaft and having an opening adjacent the blade is adapted to have a liquid solidifying agent pumped therethrough under pressure and into a cavity created by movement of the blade. The blade mixes the soil and the liquid solidifying agent so that a solidified or densified portion of the earth is obtained.

The present invention contemplates certain improvements in the tool which make it more adaptable for a larger variety of applications.

The invention further contemplates a method of strengthening the earth formation under a foundation without removing any earth around the foundation.

In accordance with the invention, a rotary shaft is provided with at least two elongated sidewardly extending blades, each pitched at a different angle and a passage through the rotary shaft whereby a liquid solidifying agent may be forced into the soil in the vicinity of the blades.

Further in accordance with the invention one of the blades may be in the form of a drilling tip on the end of the rotary shaft and the passage has an opening at, adjacent to, or in this tip. The tip is constructed in such manner that it engages the earth at a point remote from the axis of the shaft prior to engaging the earth at the axis of the shaft.

Further in accordance with the invention, there may be provided on the shaft a plurality of blades and a plurality of passages and openings with some of the blades pitched in one direction and the remaining blades pitched in the opposite direction to mix a solidifying agent and soil in situ upon rotation of the shaft and blades.

Further in accordance with the invention, the earth formation under a foundation may be solidified or densified by advancing the rotating shaft and the blades axially into the earth alongside the foundation to a point opposite the lower edge of the foundation, then moving the shaft and blades horizontally so that the blades rotate under the foundation and again axially and rotatably moving the shaft and blades into the earth and forcing liquid solidifying agent therein to densify the soil and earth directly under the foundation.

Further in accordance with the invention a solidified wall may be formed in the earth by rotatably turning a shaft having a plurality of blades thereon while slowly moving the shaft and blades in a horizontal direction and simultaneously forcing liquid solidifying agent into the earth at spaced points along the shaft, the rotation of the blades mixing the soil and the liquid solidifying agent.

In view of the foregoing modifications and the method of solidifying the earth, it is apparent that one of the objects of the present invention is to provide a method of strengthening foundations by solidifying or densifying the earth formation directly under the foundation.

A further object of the invention is to provide an improved method of forming a densified wall in the earth.

A still further object of the invention is to provide a new and improved tool for densifying the earth.

Other objects of the invention will become apparent from a fuller understanding of the present invention, an example of which is set forth for purposes of description and not of limitation and as is illustrated in the attached drawings in which.

Figure 1:
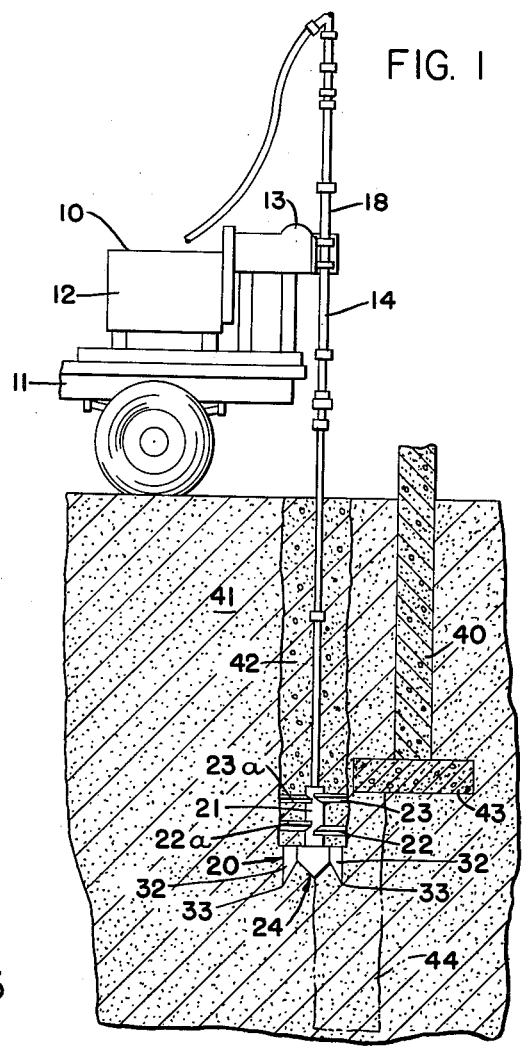
FIGURE 1 is a side elevational view partly in section, of a preferred form of the apparatus employed for carrying out the invention, the view showing the apparatus working in the earth.

Referring to FIGURE 1 of the drawing, there is shown a preferred type of apparatus including a power mechanism 10 mounted on the rear end of a truck 11 or other suitable platform. The power mechanism 10 includes a suitable motor 12 and power transmitting mechanism 13 for supporting and rotating a vertically disposed drive shaft 14 in such a manner that the shaft may be moved axially as it is rotated.

In this instance the power mechanism is adapted to rotate the hollow shaft 14 about its axis and an associated hydraulic mechanism 18 is adapted to move the hollow shaft 14 upwardly and downwardly along a path axially and as more fully described in the above mentioned co-pending patent. Mounted on the lower end of the shaft 14 is a tool 20 which incorporates the features of the present invention.

Figure 4:
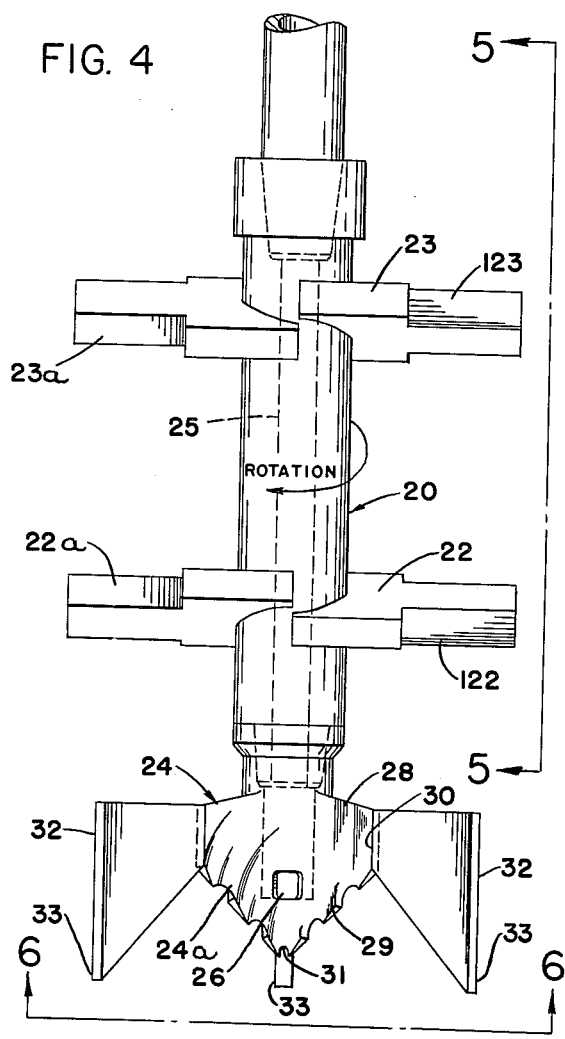
FIGURE 4 is a side elevational view of the apparatus incorporating the features of the invention.
Figure 5:
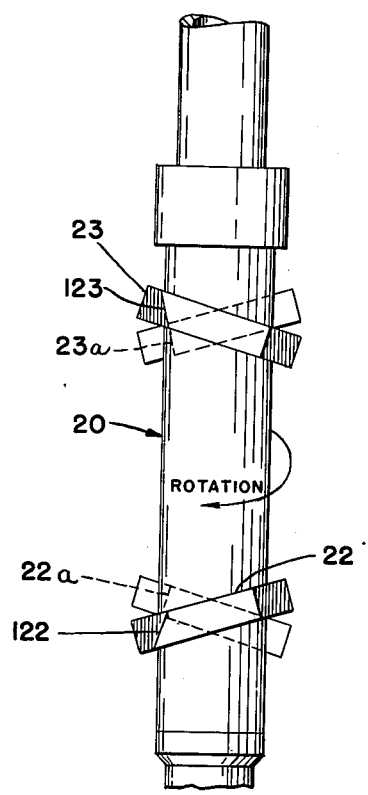
FIGURE 5 is a view taken approximately along the line 5—5 of FIGURE 4.
Figure 6:
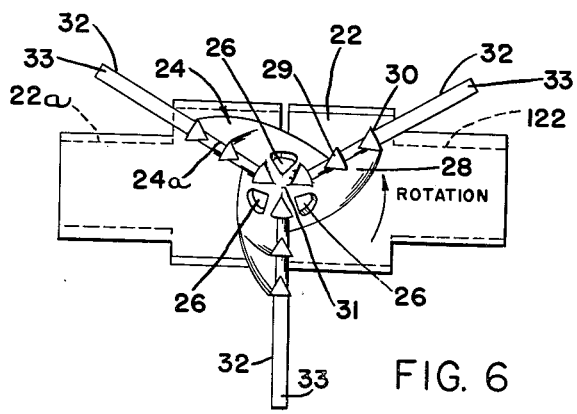
FIGURE 6 is a view taken along the line 6—6 of FIGURE 4.

As is better illustrated in the FIGURES 4, 5, and 6, the tool 20 for solidifying columns or portions in the earth by mixing the soil in situ with a liquid solidifying agent comprises an elongated rotatable shaft 21 and elongated sidewardly projecting blades 22, 22a, 23, and 23a, which are welded or otherwise secured to the shaft 21 to ensure rotation therewith. The shaft 21 terminates at its lower end in a blade or blades, such as drilling bit 24. The shaft is also provided with a closed longitudinal passage 25 provided with an opening 26 which, in this instance is positioned adjacent to and preferably in the bit 24. This passage and opening is adapted to have a liquid solidifying agent pumped therethrough under pressure and into the soil next adjacent the bit and into the soil which will be mixed and moved by the blades 22 and 23.

As is best illustrated in FIGURES 4 and 5, each blade is a rigid bar of metal of substantially greater width than thickness and is inclined at such an angle, that the leading edges of the blades will tend to cut into the earth or soil as the tool is rotated. To increase the cutting action of the blades, the leading edges, such as edge 122 of blade 22, and edge 123 of blade 23, may be sharpened and the blades may be made of hard, abrasion resistant, steel.

It has been found that mixing of the soil and the liquid solidifying agent is better accomplished with the blade 22 pitched at an angle different than the blade 23. In this instance the blade 22 is pitched to draw the shaft in one direction while the blade 23 is pitched to move the shaft axially in an opposite direction. For example one blade may tend to pull the shaft into the earth while the other blade tends to push the shaft out of the earth.

The blades 22 and 23 may be positioned substantially diametrically opposite each other on the shaft and in a relatively common plane or they may be positioned in separate planes and spaced apart axially along the shaft as illustrated in FIGURES 4 and 5. In either case it is apparent that the leading edges of the blades move in different planes of movement. Furthermore, as many blades 22 and 23 as desired may be axially spaced along the shaft. For example, in FIGURE 3, a plurality of blades are illustrated extending substantially the full length of the shaft with some of the blades pitched in one direction and/or at one angle and the other blades pitched at another angle or in an opposite direction. It is understood that considerable more power from a power mechanism 10 will be required when a plurality of blades are mounted on the tool than when only two blades are used to rotate the tool to mix the soil and cement as material together.

The drill bit or tip 24 is mounted at the bottom or lower end of the tool so that it engages the earth or soil in advance of the blades as the tool is advanced axially into the earth. The bit 24 is preferably constructed from a commercially available bit portion 24a having first wings 28 to which extension wings 32 are welded or otherwise secured. Any number of wings 28 may be used although the present illustration shows three wings 28 spaced at 120° spacing around the shaft. When more than one wing 28 is used, the opening 26 through which the liquid solidifying agent passes is preferably positioned between the wings 28. Each first wing 28 has a cutting edge 29 extending from the axis of the shaft 21 upwardly and outwardly from the axis of the tool to a peripheral portion 30 which extends substantially parallel with the axis of the shaft. The cutting edge 29 terminates in a cutting-means point 31 which is generally at the axis of the shaft, and outwardly beyond the end thereof a predetermined distance dependent on the dimensions of the portion 24a of the tip or bit 24.

Each extension wing 32 is secured along and to the peripheral portion 30 of its respective first wing 28. This wing 32 extends radially outwardly from wing 28 and also axially downwardly beyond center point 31 to provide a lower peripheral cutting point 33 which cuts or loosens the soil in advance of point 31 and circumferentially around the axis of rotation of the bit or tip 24. The extension wing 32 thus increases the life of the center of the drill tip or bit and may be easily replaced when it becomes worn. Expensive wear on the edges 29 and point 31 and around opening 26 is thus greatly reduced.

The first wings 28 may be disposed other than parallel to the axis of the shaft and the extension wings 32 may be disposed parallel to the axis of the shaft if desired and as is illustrated. It is also understood that the wings 28 and 32 may also be both parallel to the axis of the shaft or at an angle thereto. In either case, as the tool is rotated the bit 24 forms a small cavity behind each blade thereof. When the opening 26 is between succeeding wings on portion 24a, the liquid solidifying agent is forced into this cavity and is thoroughly mixed with the soil as herein described.

In the preferred embodiment illustrated, the first wings 28 are pitched at an angle different than the angle of pitch of one or more of the blades 22, 22a, 23, or 23a.

It is understood that one or more of the wings 28 and 32 may be pitched to draw the tool into the earth and one or more of the blades 22 or 23 may be pitched to push the tool out of the earth or vice versa. In such a case it is only necessary to have at least one wing and one blade to thoroughly mix the liquid solidifying agent and soil in situ, providing the wing and blade are pitched differently and preferably in opposite directions whereby the wing tends to pull the tool in one direction and the blade tends to pull it in the opposite direction.

The present tool is adapted for reinforcing a foundation, such as foundation 40, placed in the earth 41 sometime previously, and after it has been determined that the soil under the foundation should be densified to strengthen the foundation and thus increase its load bearing capacity or to maintain the foundation. The foundation 40 may be strengthened by densifying the soil underneath it without removing any of the soil, or other formations of earth from around the foundation.

In carrying out this method the tool is rotatably and axially moved into the earth 41 on one side of and substantially parallel with the foundation 40 and through a portion of the soil as illustrated in FIGURE 1 by the soil section 42. The rotatable shaft 21 of the tool and the blades 22 and 23 are inserted axially and rotatably into the earth and through the soil section 42 until the blade 23 reaches a level just under the bottom 43 of the foundation 40. The blade 23 is illustrated in this position in FIGURE 1. In the next step of the operation, the tool is moved horizontally or sidewise until the shaft 21 is close to the foundation and the blades 22 and 23 extend under the bottom 43 of the foundation 40. Following this the shaft and the blades are rotated and moved axially further into the earth to loosen the soil in a soil section 44 as illustrated by the dash-dot lines in FIGURE 1. The liquid solidifying agent is pumped thru the tool 20 and into the soil in the section 44 and is completely mixed therewith to form a densified or solidified structure under the foundation 40. After the liquid solidifying agent and the soil section 44 have been completely mixed, the tool is removed along the same path in which it was inserted into the earth 41.

Although various agents or mixtures may be used as the liquid solidifying agent, the preferred agent includes a Portland cement and suitable lubricating compounds. The agent also preferably includes expansion compounds and materials which will hold the cement in suspension when it is in the liquid state so that thorough mixing with the soil will be obtained.

Figure 2:
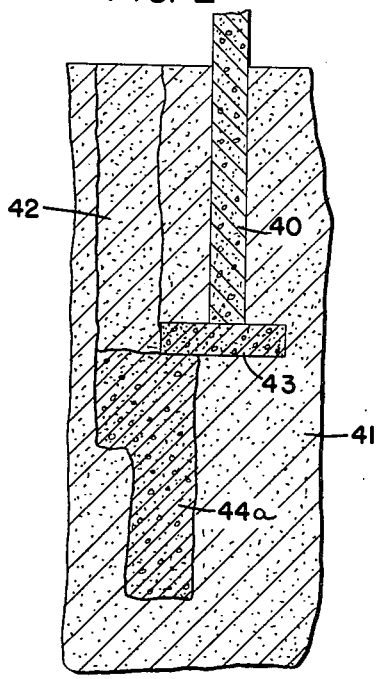
FIGURE 2 illustrates in cross section a part of the earth and a foundation therein and a solidified portion of the soil under the foundation to strengthen it.

FIGURE 2 illustrates the completed solidification and reinforcing of the foundation, the tool 20 having been removed from the earth. The soil section thoroughly mixed with liquid solidifying agent is identified by the reference character 44a, and comprises the soil section 44 and a liquid solidifying agent thoroughly mixed therewith by the rotation of blades 22 and 23.

In the illustration of FIGURE 1 it is noted that the blades 22 and 23 are axially disposed upon the rotatable shaft 21. However, it is understood that the blades 22 and 23 may be diametrically opposite each other and in substantially the same plane if desired. This will permit shortening of the overall axial length of the blades and the tip or bit so that they may be moved sideways and under the foundation when there is relatively short space between the bottom of the foundation and large rocks or dense rock formations which are relatively close to the bottom of the foundation.

Figure 3:
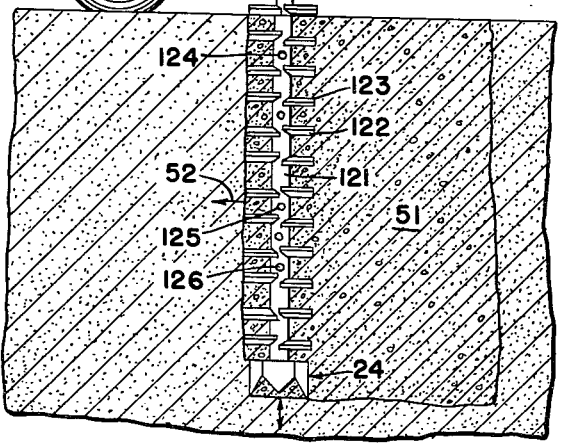
FIGURE 3 is a side elevational view, partly in section, showing a modification of the apparatus used in forming a solidified wall in the earth.

Another use of the tool is illustrated in FIGURE 3 in the application of building a dense or solidified wall through a section of earth and without removing any of the soil from the earth. In this instance a relatively long shaft 121 is used with a plurality of blades 122 and 123 spaced along the length of the shaft. As illustrated the shaft and the blades therewith are inserted axially into the earth to the desired depth of the wall. The blades and shaft are continuously rotated while the liquid solidifying agent is pumped therethrough and into the soil. In FIGURE 3 the earth is indicated by a reference character 50 and that portion of the soil already stirred, mixed and densified with liquid solidifying agent is indicated by the reference character 51. The section 51 will harden to form the wall portion extending through the earth 50. This wall portion naturally will have a thickness approximately equal to the rotational diameter of the shaft and the blades thereon and will have a length determined by the longitudinal movement in the direction indicated by the arrow 52 of the shaft and blades.

The shaft 121 may have a plurality of liquid solidifying agent passages therethrough with each passage independently and separately opening adjacent different of the blades 122 and 123. For example in FIGURE 3 there is illustrated a plurality of openings, one for each passage, such as the openings 124, 125, and 126.

These openings 124, 125, and 126 and the remainder of the similar openings may be independently connected through independent passages extending longitudinally of the rotatable shaft 121. It is also understood that they may all be connected to a common passage. Closer inspection of the flow of liquid solidifying agent through each opening may be had if each opening is connected to an independent passage. In this manner if a particular opening becomes clogged it will be apparent above ground that the opening has become clogged since liquid solidifying agent will not be flowing through the corresponding passage whereas if all of the openings are on a common passage, such clogging of a particular opening will not be readily apparent. The blades 122 and 123 are, as previously described, preferably pitched in opposite directions so that they will thoroughly mix the soil and the liquid solidifying agent to form the solidified section 51 as the shaft and the blades are rotated and longitudinally moved through the earth 50.

In these various applications and modifications of the tool, some of the blades are pitched at one angle and other blades are pitched at another angle. This is accomplished in the present example by pitching one blade in one direction and another blade in another direction. The tool thus lends itself readily to the described method of strengthening earth formations under footings and the constructing barrier walls in situ and without removing any of the earth formations.

Various other modifications of the tool and the methods will become apparent from an understanding of the specific example herein without departing from the spirit and scope of the invention as hereinafter claimed.

Having thus described my invention, I claim:

1. In a tool for solidifying columns in the earth by mixing the soil in situ with a liquid solidifying agent, including an elongated rotatable shaft, at least two axially-spaced, elongated, sidewardly-projecting blades on the said shaft, each adapted to create a cavity in the earth as the shaft is rotated, a closed passage extending longitudinally of the shaft and having an opening adjacent to at least one of the blades and adapted to have a liquid solidifying agent pumped therethrough under pressure and into the cavity created by movement of the blades, the improvement which comprises said blades being pitched in opposite direction.

2. In a tool for solidifying columns in the earth by mixing the soil in situ with a liquid solidifying agent, including an elongated shaft rotatable on an axis, two axially-spaced pairs of elongated radially projecting blades on the said shaft, each blade adapted to create a cavity in the earth as the shaft is rotated, closed passage means extending longitudinally of the shaft and having openings aligned radially relative to the blades and adapted to have a liquid solidifying agent pumped therethrough under pressure and into the cavities created by movement of blades, the improvement which comprises each of said pairs of blades being pitched in an opposite direction to the other.

3. In a tool for solidifying columns in the earth by mixing the soil in situ with a liquid solidifying agent, including an elongated rotatable shaft, two axially-spaced pairs of elongated sidewardly projecting blades on the said shaft, each adapted to create a cavity in the earth as the shaft is rotated, a closed passage extending longitudinally of the shaft and having an opening aligned relative to at least one of the blades and adapted to have a liquid solidifying agent pumped therethrough under pressure and into the cavity created by movement of the blade, the improvement which comprises each pair of said blades being pitched at equal but opposite angles.

4. A tool for solidifying columns in the earth by mixing the soil in situ with a liquid solidifying agent, comprising in combination, an elongated rotatable shaft, at least two elongated, axially-spaced, sidewardly projecting blades pitched at different and opposite angles on said shaft and adapted to penetrate and mix the soil as the shaft is rotated in the earth, and a closed passage extending longitudinally of the shaft and having an opening in close proximity with at least one of the blades and adapted to have a liquid solidifying agent pumped therethrough under pressure and into the soil being mixed by movement of the blades.

5. A tool for solidifying columns in the earth by mixing the soil in situ with a liquid solidifying agent, comprising in combination, an elongated rotatable shaft, at least two, axially-spaced pairs of elongated sidewardly projecting blades with each pair pitched in opposite directions on said shaft and adapted to penetrate and mix the soil as the shaft is rotated in the earth, and closed passage means extending longitudinally of the shaft and having openings in close proximity with the blades and adapted to have a liquid solidifying agent pumped therethrough under pressure and into the soil being mixed by movement of the blades.

6. A method for solidifying earth under a foundation by mixing the soil in situ with a liquid solidifying agent comprising the steps of providing a shaft having an elongated sidewardly extending blade rotating said shaft about an axis while simultaneously advancing it axially into the earth until the blade reaches a depth in the earth at least equal to the depth of the foundation, moving the shaft and blade horizontally toward the foundation to move the blade under the foundation, and thereafter progressively rotating the shaft and blade about its axis while simultaneously advancing it axially into the earth so that the blade progressively moves and loosens the soil under the foundation, and simultaneously forcing a liquid solidifying agent into the soil adjacent the blade whereby the rotation of the blade mixes the soil under the foundation with the solidifying agent.

7. A method for solidifying earth under a foundation by mixing the soil in situ with a liquid solidifying agent comprising the steps of providing a shaft having at least two elongated sidewardly extending blades pitched at different and opposite angles rotating said shaft about an axis while simultaneously advancing it axially into the earth until the blades reach a depth in the earth at least equal to the depth of the foundation, moving the shaft and blades horizontally to move the blades under the foundation, and thereafter progressively rotating the shaft and blades about its axis while simultaneously advancing it axially into the earth so that the blades progressively move and loosen the soil under the foundation, and simultaneously forcing a liquid solidifying agent into the soil adjacent the blades whereby the rotation of the blades mixes the soil under the foundation with the solidifying agent.

8. A method for solidifying earth to form a wall by mixing the soil in situ with a liquid solidifying agent, comprising the steps of providing a shaft having a plurality of axially-spaced elongated sidewardly extending blades, continuously rotating about a vertical axis while progressively moving the shaft and blades horizontally so that the blades progressively move and loosen the soil, and simultaneously forcing a liquid solidifying agent into the soil in the direction of the horizontal movement at a plurality of points along said shaft and adjacent the blades whereby the rotation of the blades mixes the soil with the solidifying agent to progressively form a wall in the earth.

References Cited in the file of this patent

UNITED STATES PATENTS

| | | |
|---|---|---|
| 312,185 | Butler | Feb. 10, 1885 |
| 700,430 | Lane | May 20, 1902 |
| 715,385 | Jones | Dec. 9, 1902 |
| 935,081 | Wolfsholz | Sept. 28, 1909 |
| 1,430,040 | Trust | Sept. 26, 1922 |
| 1,495,367 | Wiltrout | May 27, 1924 |
| 1,809,351 | Oliver | June 9, 1931 |
| 1,866,073 | Aberle | July 5, 1932 |
| 1,899,771 | Reed | Feb. 28, 1933 |
| 2,015,244 | Stockdale | Sept. 24, 1935 |
| 2,064,936 | McQuiston | Dec. 22, 1936 |
| 2,199,692 | Catland | May 7, 1940 |
| 2,352,412 | Sandstone | June 27, 1944 |
| 2,682,388 | Colquitt | June 29, 1954 |
| 2,782,605 | Wertz et al. | Feb. 26, 1957 |
| 2,801,079 | Gress | July 30, 1957 |
| 2,823,013 | Stenuick | Feb. 11, 1958 |
| 2,830,794 | Mills | Apr. 15, 1958 |

OTHER REFERENCES

Farm Implement and Machinery Review, Oct. 1, 1953, pp. 1048, 1049.